United States Patent [19]

Thomaides et al.

[11] Patent Number: 4,838,903
[45] Date of Patent: Jun. 13, 1989

[54] MULTI-PHASE THICK-BED FILTER

[75] Inventors: Lazarus Thomaides, North Wales; Steven I. Taub, Narbeth, both of Pa.

[73] Assignee: Ceco Filters, Inc., Conshohocken, Pa.

[21] Appl. No.: 52,311

[22] Filed: May 20, 1987

[51] Int. Cl.⁴ .......................................... B01D 46/02
[52] U.S. Cl. .......................................... 55/97; 55/480; 55/486; 55/498
[58] Field of Search .................... 55/97, 480, 481, 482, 55/486, 498, DIG. 25, 508

[56] References Cited

U.S. PATENT DOCUMENTS

| | | |
|---|---|---|
| 940,142 | 11/1909 | Fogarty . |
| 1,073,883 | 9/1913 | Aikman . |
| 1,892,210 | 12/1932 | Gordon ........................... 55/498 X |
| 1,912,235 | 5/1933 | Winslow . |
| 1,925,413 | 9/1933 | Smith . |
| 2,145,049 | 1/1939 | Heuberger . |
| 2,404,468 | 7/1946 | Vokes et al. . |
| 2,771,153 | 11/1956 | Hennig ........................... 55/487 X |
| 2,861,651 | 11/1958 | Miller . |
| 3,107,986 | 10/1963 | Plaut et al. ............... 55/DIG. 25 X |
| 3,135,592 | 6/1964 | Fairs et al. . |
| 3,204,388 | 9/1965 | Asker . |
| 3,384,241 | 5/1968 | Nostrand ........................ 55/487 X |
| 3,399,516 | 9/1968 | Hough, Jr. et al. .................. 55/487 |
| 3,422,602 | 1/1969 | Janson . |
| 3,488,928 | 1/1970 | Tarala ............................ 55/481 X |
| 3,540,190 | 11/1970 | Brink, Jr. . |
| 3,567,619 | 3/1971 | Brown . |
| 3,675,776 | 7/1972 | Campo . |
| 3,742,683 | 7/1973 | Sebest et al. . |
| 3,800,514 | 4/1974 | Avondoglio et al. ..... 55/DIG. 25 X |
| 3,912,634 | 10/1975 | Howell . |
| 4,046,525 | 9/1977 | Matsuo et al. . |
| 4,053,290 | 10/1977 | Chen et al. ............... 55/DIG. 25 X |
| 4,086,070 | 4/1978 | Argo et al. ...................... 55/97 |
| 4,111,815 | 9/1978 | Walker et al. . |
| 4,120,671 | 10/1978 | Steinmeyer ...................... 55/486 X |
| 4,198,726 | 4/1980 | Powell, Jr. . |
| 4,203,739 | 5/1980 | Erdmannsdörfer .............. 55/487 X |
| 4,205,971 | 6/1980 | Abthoff et al. . |
| 4,249,918 | 2/1981 | Argo et al. . |
| 4,251,238 | 2/1981 | Claes et al. . |
| 4,350,592 | 9/1982 | Kronsbein . |
| 4,360,433 | 11/1982 | Walker et al. . |
| 4,477,270 | 10/1984 | Tauch . |
| 4,632,682 | 12/1986 | Erdmannsdorfer . |

FOREIGN PATENT DOCUMENTS 1237198  6/1960  France ................................ 55/482

Primary Examiner—Charles Hart
Attorney, Agent, or Firm—Seidel, Gonda, Lavorgna & Monaco

[57] ABSTRACT

The invention being a multi-phase thick bed filter assembly having a main filter element the primary function of which is to remove aerosols from a moving gas stream and having an associated, readily removable upstream pre-filter element designed to remove solid particulate matter from the gas stream before its impingement on the main filter.

16 Claims, 5 Drawing Sheets

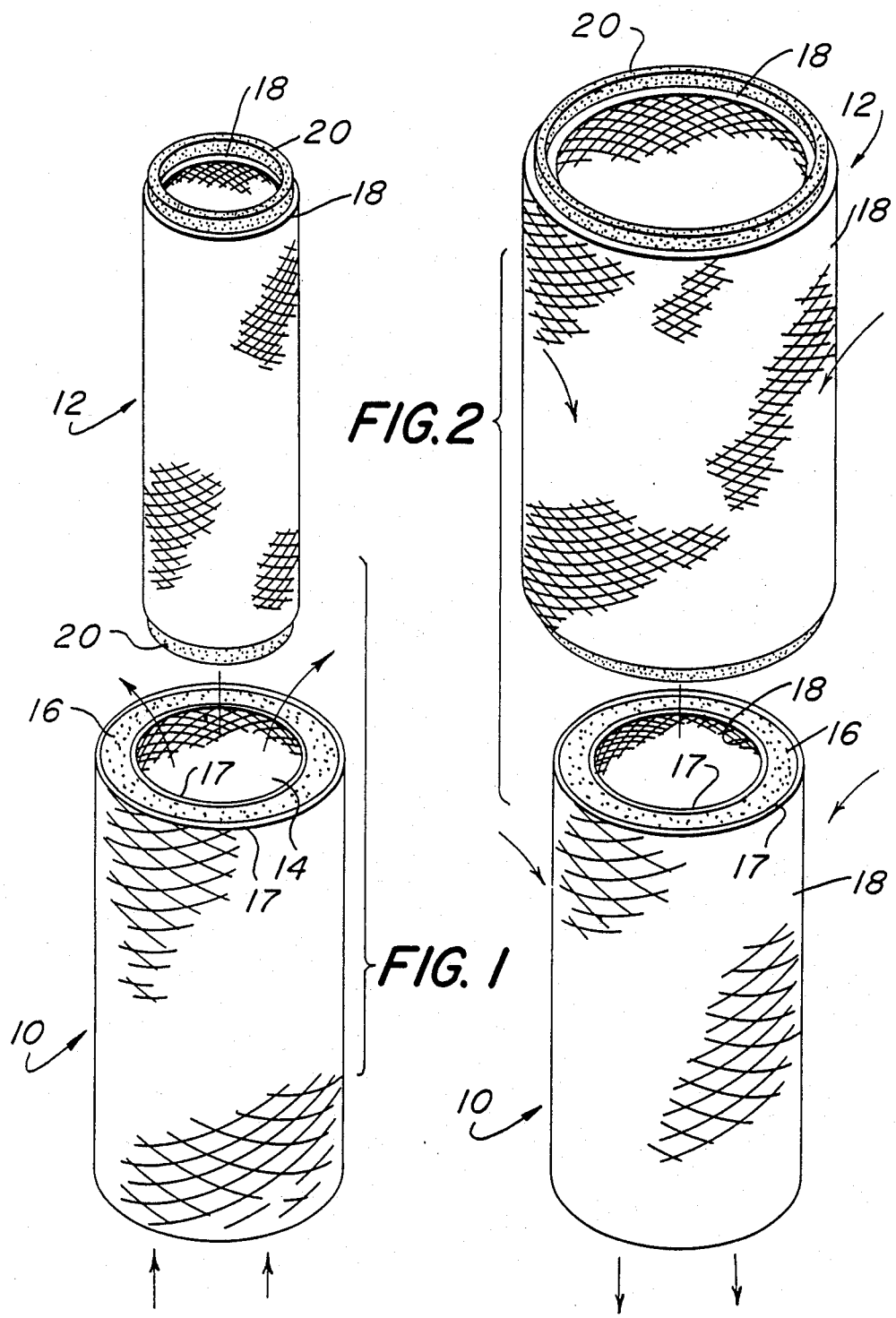

MULTI-PHASE THICK-BED FILTER

BACKGROUND OF THE INVENTION

Thick bed fiber filters, also called candles, aerosol filters, mist filters and mist eliminators represent the most advanced method of collection of fine particulates having a diameter of less than three microns. This type of device has an efficiency in excess of 99% for particles having a diameter as small as 1/10th of a micron. Processed gas contaminants, such as fumes, smog, oil and resin smoke, are typically one micron or less in diameter.

These units are widely used in many industries to remove liquid and semi-liquid mists carried in a process gas. In many cases, solid particulates are also present as a result of the process operations. Unfortunately, the candles are as efficient for solids as they are for liquids. Because liquids drain continuously they do not present a problem. Solids, however, tend to remain in the filter, trapped between the interstices of the filter media. Eventually, the filter becomes plugged rendering it ineffectual. As the filter becomes impregnated with solids, the pressure drop across the filter increases over a period of time but efficiency remains constant. A filter change must be made to return the pressure drop to a satisfactory level.

Prior art techniques for ameliorating this problem utilize "socks" to protect the candles from plugging by accumulation of solid particles. The socks comprise a layer of filter media having an average packing density of only 2 pounds per cubic foot. The sock is wrapped around the outside of the candle to trap particles before they reach the aerosol primary filter. It was thought that this would extend the useful life of the primary filter. This concept did not work very well because of the low packing density and large diameter fibers of the sock material. Other methods of pressure drop recovery have included washing in place or washing externally using the appropiate washing medium to dissolve the solids and semi-solids from the filter media or by installing a new set of filters. Washing is expensive and time consuming. Moreover, the degree of recovery achieved using such a procedure is affected by the type and size of collected solids and the rapidity of solid dissolution by the washing media. Experience has shown that only a portion of the pressure drop is recovered and the effect of the wash cycle will eventually require main filter replacement.

SUMMARY OF THE INVENTION

A thick-bed filter assembly for removal of aerosols and solid particulate matter from a moving gas stream is provided. A main filter element in the assembly contains a first fiber bed for removing aerosols from the gas stream. The assembly also contains a pre-filter element containing a second fiber bed adjacent to the main filter element and located upstream thereof. The pre-filter removes solid and liquid particulate matter from the gas stream. The assembly contains means for detachably retaining the pre-filter element in the assembly to permit its easy removal for cleaning or replacement without removing the main filter element.

According to one embodiment of the invention, an upstanding main filter element is supported by a tube sheet. An upstanding pre-filter element is disposed concentrically of the main filter element and on the upstream side thereof. A top plate overlying the open ends of the assembly is removably secured to the main filter element.

In yet another embodiment the main filter element is supported by a tube sheet. The tube sheet contains an opening beneath the filter assembly for the passage of gas. A removable top plate overlying the filter elements has a centrally disposed aperture for receiving a rod means. A threaded aperture is supported in the opening of the tube sheet coaxially aligned with the centrally disposed aperture in the top plate. A rod means passing through the top plate aperture threadably engages the threaded aperture supported in the tube sheet opening. The top plate is secured to the filter assembly by a nut means on the rod.

A method for removal of aerosols and solid particulate matter from a moving gas stream is also provided. A gas stream is passed through a thick-bed filter assembly having a main filter element containing a first fiber bed for removing aerosols from the gas stream. The filter assembly has a pre-filter element containing a second fiber bed adjacent to the main filter element and located upstream thereof for recovering solid particulate matter from the gas stream. The assembly contains means for detachably retaining the pre-filter element in the assembly to permit easy removal of the pre-filter for cleaning or replacement without removing the main filter element.

It has been discovered that the initial $\frac{1}{4}$ inch to $\frac{1}{2}$ inch of the filter media does the bulk of the trapping and holding of the contaminating material, including solids.

Accordingly, it is an object of the present invention to provide a multi-phase filter assembly in which that portion of the filter initially contacted by the gas stream can easily be removed and replaced.

It is further object of this invention to provide a multi-phase filtering system in which the pre-filter is designed to remove solid particulate matter to such a degree that its replacement returns the system to substantially pristine condition.

It is a still further object of the invention to provide a thick-bed filter assembly meeting the above criteria which reduces maintenance time, and which has little or no effect on the up-stream process conditions with which it is associated.

It is yet another object of the invention to provide a multiple-phase filter assembly designed and constructed to reduce the cost of filter replacement and change-over time, including minimal down-time for the process system itself. In achievement of this end, the initial layers of the filter are structured as sub-assemblies with the total composite designed to meet the requirements of liquid and solid collection. More particularly, the pre-filter is sandwiched between cages so that replacement time is reduced to a minimum.

For the purpose of illustrating the invention, there is shown in the drawings forms which are presently preferred; it being understood, however, that this invention is not limited to the precise arrangements and instrumentalities shown.

DESCRIPTION OF THE DRAWINGS

FIG. 1 is a perspective view of the filter elements of a thick-bed filter assembly designed for an inside/out gas flow system in which the pre-filter is in the form of a caged insert.

FIG. 2 is a perspective view of the filter elements of an outside/in gas flow system using a caged pre-filter positioned on the outside of the main filter.

DETAILED DESCRIPTION OF THE INVENTION

Figure 3:
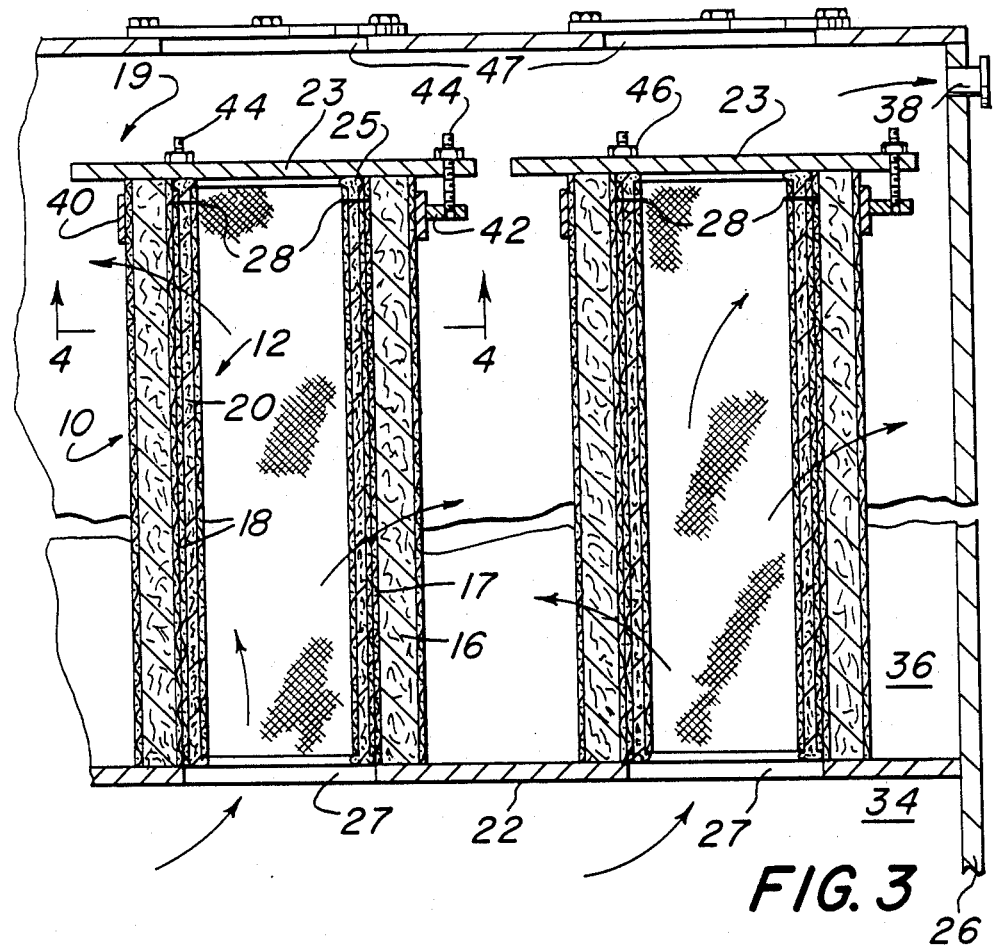
FIG. 3 is a cross-sectional view of an inside/out thick-bed filter assembly using a replaceable pre-filter constructed in accordance with the present invention.

Depending on the direction of gas flow, the pre-filter can either be placed around the outside of the main filter or can be inserted internally into it. The prior art "sock" was not capable of the latter since it was not rigid. It was merely wrapped around the outside of the main filter, and depended on the main filter for structural support. The sock could not be used in inside/out type filtering operations.

The pre-filter bed media is generally selected from an inexpensive material in comparison with the main filter material. Since the pre-filter has a much shorter intended life, less expensive materials are acceptable. Thus, whereas chemical grade fiberglass may be used for the main filter, the pre-filter could be special grade fiberglass or polyester. The pre-filter is most advantageously formed of a bed of fibers having a fiber diameter from about 2 to about 100 microns, with about 8 to about 50 microns being preferred.

Another parameter governing the effectiveness of the pre-filter media is packing density. Typically, packing densities of about 6 to about 12 pounds per cubic foot are used. While higher packing densities may be possible, the pressure drop would be adversely increased. If packing densities of less than 6 pounds per cubic foot are employed, the pre-filter would not be efficient enough and will allow solid particles to pass through and impinge on the main filter.

The preferred thickness of the pre-filter bed is between ¼ and ¾ inches, but other thicknesses may be employed. The pre-filter thickness is largely dependent on the specific application.

The pre-filter is capable of removing solid particulate matter from the gas stream having a diameter of 0.5 microns or greater.

As previously noted, the pre-filter may be formed of any material suitable for the service required, such materials include polyesters, polypropylene, special grade fiberglass, chemical grade fiberglass, ceramic fibers, particularly aluminum silica fibers, e.g., mullite, and flurocarbon materials such as "TEFLON", made into fibers.

The principal advantage of the invention is that the pre-filters are field changable, that is, the operator can remove and replace the pre-filter without disassembling the filter apparatus or removing the main filter. The normal factors which limit the life of aerosol filters are corrosion of the cages and filter material, and more importantly, plugging of the filter material by solids. In instances where the pre-filter is 100% successful in keeping solids off of the main filter and the gas is non-corrosive, the life of the main filter can be extended almost indefinitely. By providing for ready removal of the pre-filter, operation of the underlying process may be continued substantially without interruption.

With particular reference to FIGS. 1 and 2 of the drawings, there is illustrated the two basic forms of prefilters employed in the invention. FIG. 1 depicts the form of the invention in which the pre-filter 12 is inserted into cavity 14 formed by the main aerosol filter 10. FIG. 2 depicts the form of the invention in which the pre-filter 12 is positioned externally of the main filter 10. When the flow of gas is in the direction shown by arrows in FIG. 1, the solid contaminants accumulate on the inside of the candle. In FIG. 2 with gas flow as shown by the arrows, the solid contaminants will accumulate on the outside of the candle.

The filters need not necessarily be cylindrical candle filters as shown in FIGS. 1 and 2, but may have any desired polygonal cross-section in which filter layers are provided in any desired manner supported by suitable framework.

The main filter media is typically comprised of a bed 16 of randomly distributed fibers having a mean fiber diameter of at least about 2 to 50 microns packed to a density of from 6 to 12 pounds per cubic foot. Suitable fiber materials, may include, for example, fibers of polymeric material such as polyesters, polyvinylchloride, polyethelene, flurocarbons, nylons, polypropylene; glass fibers; and ceramic fibers.

Preferably, the pre-filter media forms a bed 20 sandwiched between support screens 18 of an open network material for structural support. These screens, sometime referred to as "cages" may be formed from plastic, metal or other suitable material for structural support. When the pre-filter becomes loaded with solid particles, it can easily be removed from the filter assembly and replaced. As will hereinafter be noted, the pre-filter is always installed on the pressure side of the main or candle filter, or what is hereinafter described as the upstream side of the assembly.

The main filter media 16, like the pre-filter media, may form a bed sandwiched between cages 17 of a plastic, metal or other suitable material for structural support. Similarly, in FIG. 2 main filter media 16 may form a sandwich bed between cages 18.

In a preferred embodiment, the pre-filter bed 20 extends ½ inch to 1 inch past the ends of the cage to form an overhang as shown in FIGS. 1 and 2. As will be seen in FIGS. 3 and 5, this overhang allows the pre-filter to act as a seal preventing gas from reaching the main filter prior to pre-filtering by the pre-filter.

Referring to FIG. 3, two multi-phase filter assemblies generally designated 19 are supported side-by-side on tube sheet 22. For purposes of illustration, only two such assemblies are shown, it being understood that any number of assemblies may be contained in the treatment vessel 26. To permit ready access to the filter assemblies, access openings 47 may be provided at the top of the vessel. The assemblies are of the inside/out flow type, that is, processed gas enters from an inlet (not shown) in the bottom of the vessel and travels upward through openings 27 in the tube sheet and into the annular space defined by pre-filter 12. The tube sheet spans the inside of vessel 26, separating it into high and low pressure zones 34 and 36, respectively. The gas then flows radially outward through the pre-filter 12 and filter 10. Solids are collected by the pre-filter while aerosol-laden gas is further filtered by the main filter 10. The thus-filtered processed gas, substantially free of solid and liquid particulates, exits the vessel from port 38.

Figure 4:
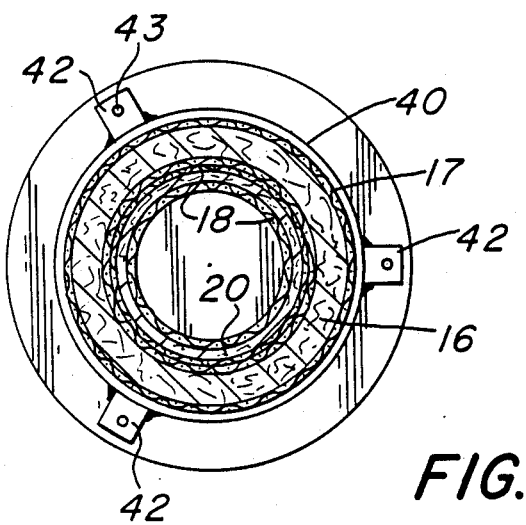
FIG. 4 is a sectional view of the composite filter taken in the direction of the arrows along the section line 4—4 of FIG. 3.

An annular ring 40 is affixed, e.g., by welding or other means to the outer periphery of cage 17 of the main filter, adjacent to the top end of the filter. A series of radially outwardly extending plates 42 are spaced equidistant around ring 40 to form a type of external spider around the filter assembly. The top of each filter assembly is closed by a top plate 23. The plate is secured in place by bolts 44 which pass through orifices in the tube plate and mating orifices 43 in each of plates 42. The bolts 44 are secured by nuts 46. Referring to FIG. 4, it can be readily appreciated that top plate 23 must contain orifices interspersed around its periphery and in alignment with the orifices 43 on plate 42 to accommodate bolts 44. The bolts 44 effectively clamp the top plate to the filter assembly, thereby creating a seal.

The embodiment of FIG. 3 is one manner of adapting the present invention to an existing aerosol filter installation which utilizes inside/out candle filters supported by a tube sheet.

The portion of the pre-filter bed 20 which extends and overhangs beyond the pre-filter cages 18 acts as a gas seal. Top plate 23 pressing down on the filter assembly causes compression of the pre-filter bed 20 into a generally mushroom shape 25 thereby sealing off the top end of the main filter and preventing gas from reaching the main filter before passing through the pre-filter.

It may be noted in FIG. 3 that the pre-filter 12, unlike the main filter 10, is not always supported by the tube sheet 22. It may therefore be necessary to attach the prefilter to the main filter to prevent the former from falling out of the assembly.

Means for detachably retaining the pre-filter to the main filter are provided. The means may take the form of any suitable temporary attachment device such as clips, clamps, wire, twist ties, etc.

The pre-filter 12 is most advantageously connected to the inner cage 17 of the main filter 10 by a wire tie 28. The tie can be simply run through the cages and tied off.

Figure 7:
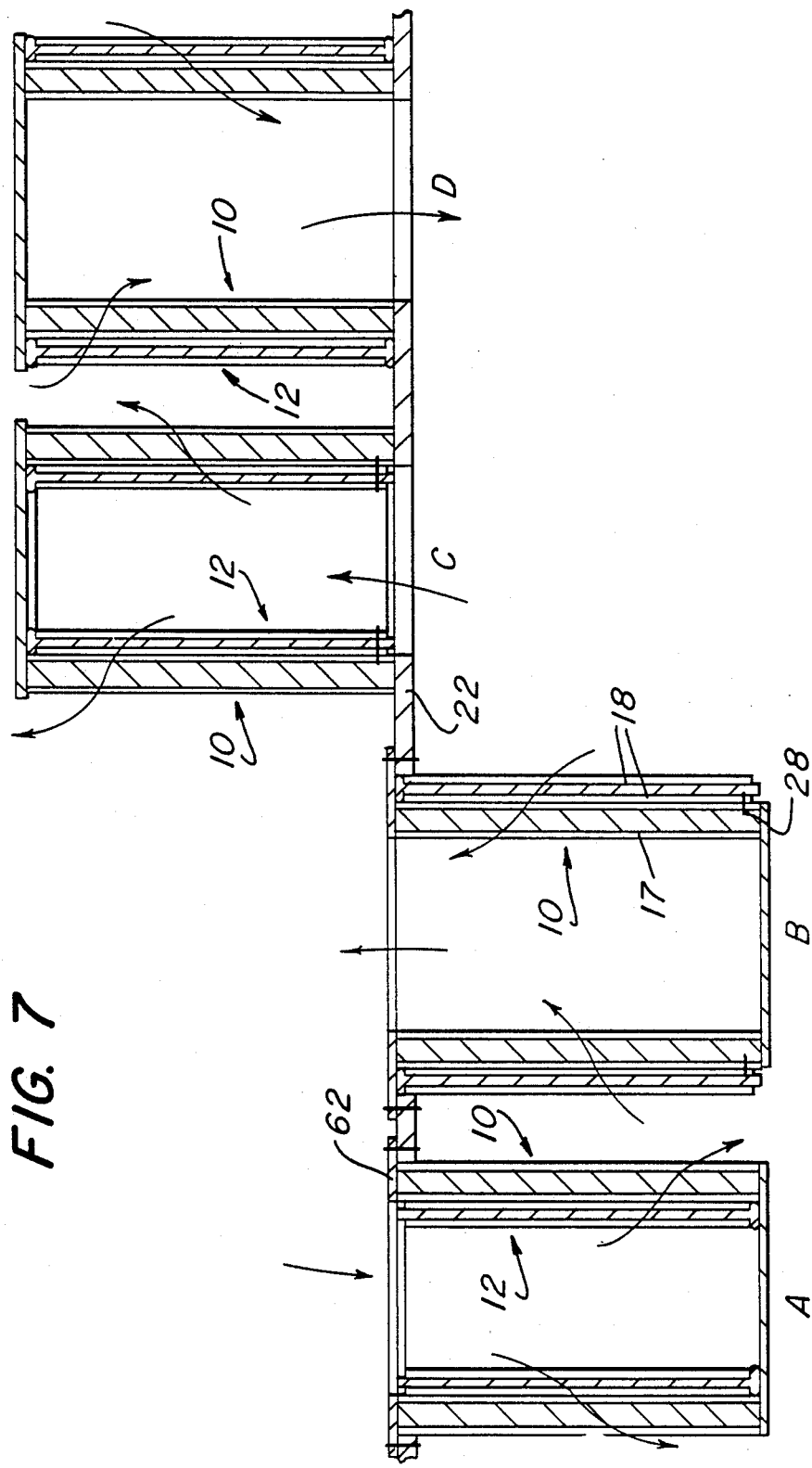
FIG. 7 is a diagramatic representation showing the various modes of mounting the thick-bed filter assembly to a tube sheet.

While the filter assembly is shown in FIG. 3, for purposes of illustration, supported by a tube sheet, it should be understood that, as shown in FIG. 7, the filter assemblies may, alternatively, be suspended from the tube sheet.

Figure 5:
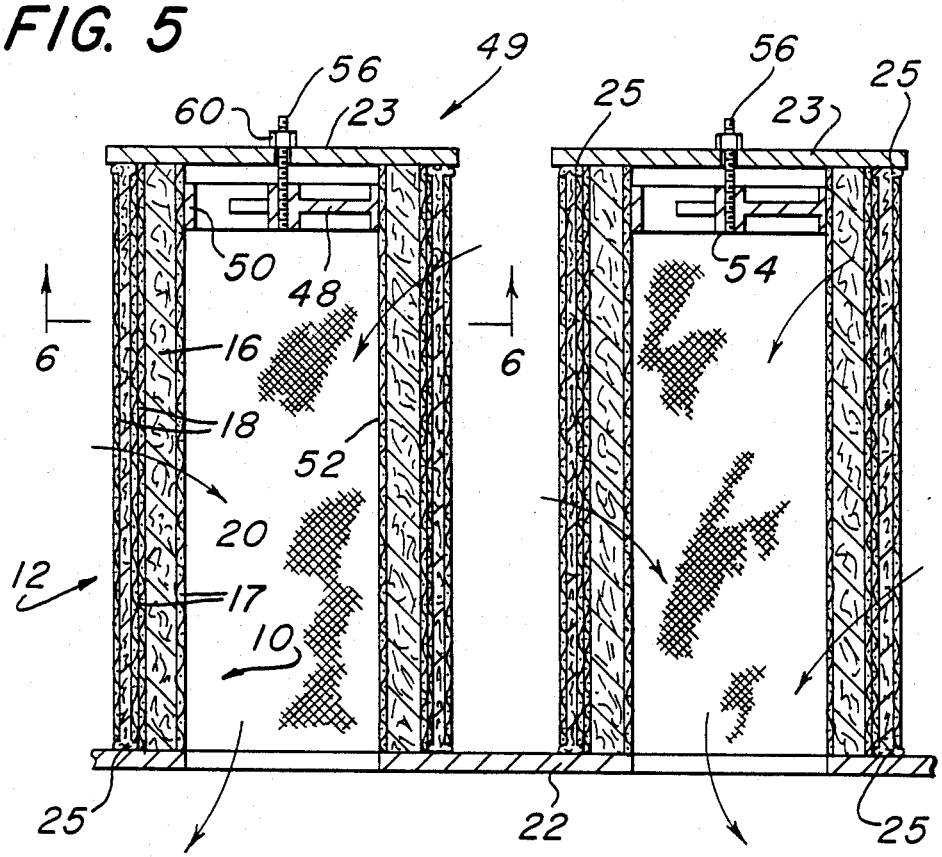
FIG. 5 is a cross-sectional view of an outside/in thick-bed filter assembly constructed in accordance with the present invention.
Figure 6:
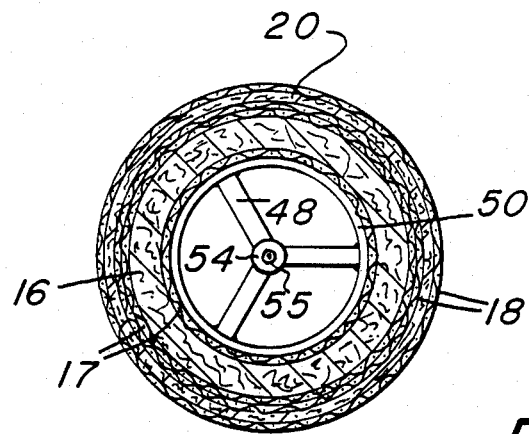
FIG. 6 is a sectional view of the composite filter taken in the direction of the arrows along the section line 6—6 of FIG. 5.

Referring to FIG. 5, two multi-phase filter assemblies generally designated as 49 are supported side-by-side on tube sheet 22. The main and pre-filter elements are constructed as in FIGS. 1-3, that is, each member is formed from a fiber bed sandwiched by suitable supporting cages. For ease of illustration, the containment vessel is omitted, it being understood that the tube sheet 22 otherwise separates a vessel into high and low pressure zones as in FIG. 3, it being further understood that the zones are reversed in FIG. 5. The assemblies are of the outside/in flow type, that is, gas flows radially inward from the high pressure zone of the vessel, through the filter beds and into the cylindrical space within the main filter 10 and out the open end of the assembly, which is supported by tube sheet 22.

FIG. 5 represents an alternate embodiment for mounting the pre-filter element within the assembly using an internal spider. A spider 48 is mounted to a band 50 which is secured, as by welding, to the inner cage 17 of the main filter element 10. The spider has a central boss 54 provided with a threaded hole 55 adapted for engagement by a threaded bolt 56, as seen in FIG. 5. The bolt extends upward into a hole provided in the top cover plate 23. A compression nut 60 secures the top plate 23 in sealing engagement with the pre-filter bed 20 compressing it into a mushroom shape 25.

The pre-filter 12 is supported on the tube sheet 22 as is the main filter element 10. In this form of assembly the pre-filter element is self-supporting on tube sheet 22. It can readily be appreciated that the means for detachably retaining the pre-filter in the assembly in this embodiment of the invention comprises the tube sheet itself in supporting the pre-filter against the force of gravity. In the embodiment of FIG. 5, the pre-filter is also held in place by top plate 23 which is removably secured across the top of the filter assembly.

FIGS. 3 and 5 depict different structural designs for holding the top plate 23 securely in place while at the same time permitting easy removal of the pre-filter from the assembly when its replacement is required. In both embodiments, the pre-filtering element 12 can be readily removed from the system by the simple expedient of removing the compression nuts, and in the case of FIG. 3, additionally cutting the ties 28. Securement of the main filter element to the tube sheet is by means well known in the art.

Where the prefilter is positioned external of the main filter element (as shown in FIG. 5), the diameter of top plate 23 may, in some instances, be less than the inside diameter of the pre-filter 12. In such cases (not shown) the prefilter may be lifted from the assembly without removing the top plate.

By placement of the pre-filter in the manner shown in FIGS. 3 and 5, all of the gas passes through the pre-filter before impinging on the main filter. Efficiency of the pre-filter is effectively about 90%, this being a measure of the liquids and solids which it filters out.

The filter assembly may be installed in the vessel either suspended from the tube sheet or mounted to the tube sheet in upright position. FIG. 7 shows, in diagramatic form, the various arrangements for mounting the filter assembly to the tube sheet. The direction of gas flow in each instance is indicated by the arrows. Viewing the arrangements from left to right there is shown in A a filter assembly in which the pre-filter element 12 is disposed internally of the main filter element 10. The main filter is mounted in place by plates 62 secured to the filter and bolted to the tube sheet 22. In the unit marked B the pre-filter 12 is mounted externally of the main filter 10. The pre-filter is held in place by being tied to the main filter cage 17 by tie 28. Assemblies A and B in FIG. 7 hang from the tube sheet 22. Assemblies C and D are mounted on top of the tube sheet and show, respectively, the pre-filter 12 mounted internally and externally with respect to the main filter 10. While the pre-filter is supported by tube sheet 22 in D, it must be fastened to the main filter in C.

Figure 8:
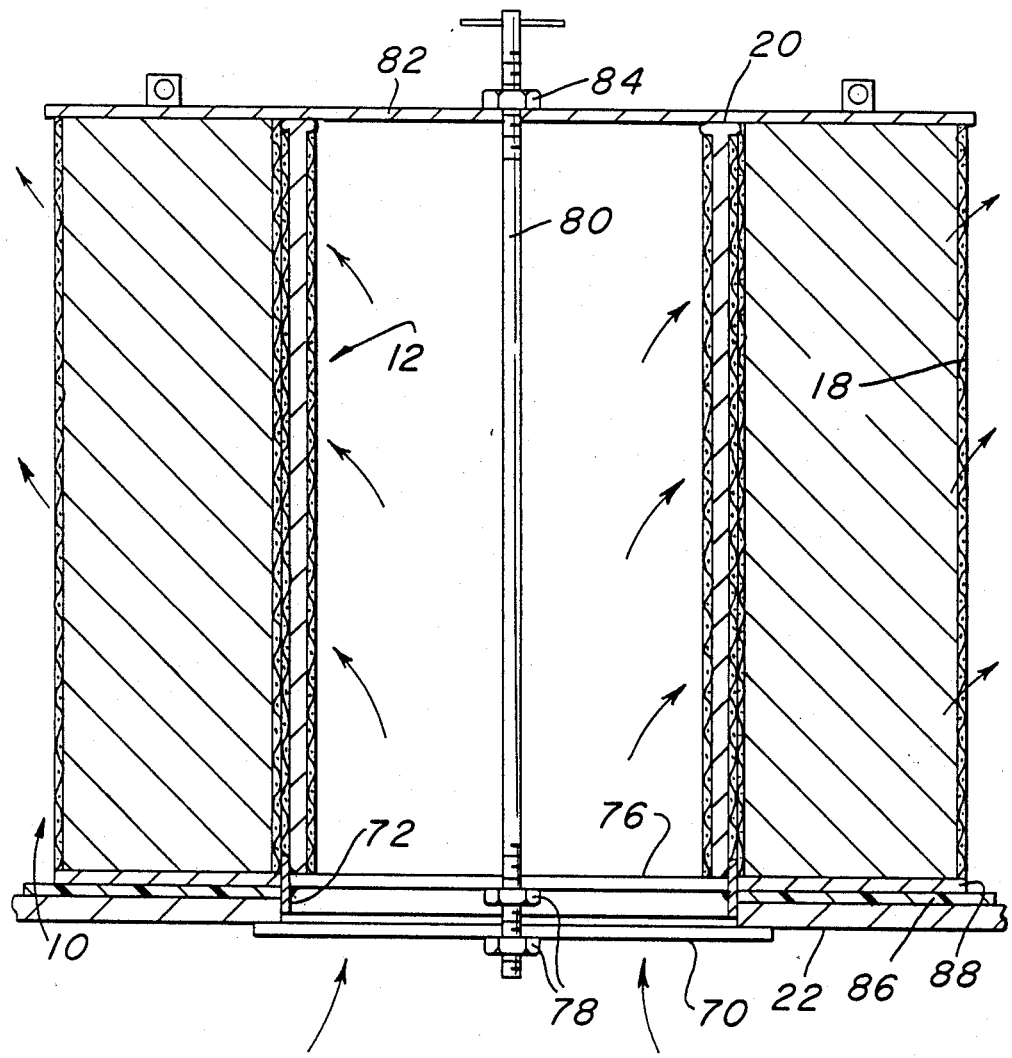
FIG. 8 is another thick-bed filter assembly accordingly to the invention.

Yet another embodiment of the multi-phase filter assembly is shown in FIG. 8. Gas flow is in the direction indicated by the arrows. A cross bar 70 is fixed, for example by welding, across the opening in tube sheet 22. An annular band 72 is similarly fixed, such as by welding, to the inner periphery of the inner cage 17 of the main filter element 10 adjacent the lower extremity of the main filter element. Band 72 is used to properly seat the filter within the tube sheet opening when the filter is installed from a top access opening. A second cross bar 76 spans the inside diameter of annular band 72 and is fixed thereto, such as by welding. Hex nuts 78 are attached at a central location to each of the cross bars 70 and 76. A rod 80 is threaded through the hex nuts 78 and secures a top plate 82 in place over the assembly by means of a compression nut 84. The main filter element 10 is prevented from being contacted by the gas stream until it passes through the pre-filter 12 by means of the seal formed between the top plate 82 and pre-filtering bed 20 in the manner previously noted. To perfect the seal a gasket 86 is interposed between the candle flange 88 and tube sheet 22. Tightening nut 84 compresses both the gasket 86, the filter bed 20, and filter element 10.

While for purposes of illustration the pre-filter is shown located internally of the main filter in FIG. 8, it should be appreciated that the pre-filter and filter may be reversed, depending on the application.

In each of the embodiments shown in FIGS. 3 through 8, means are provided for detachably securing the pre-filter element within the filtering assembly. By the simple expedient of loosening one or more compression nuts, and/or severing a restraining tie, and/or simply lifting the pre-filter from the assembly, the pre-filter can be quickly and easily removed from the assembly for replacement without removing the main filter.

The present invention may be embodied in other specific forms without departing from the spirit or essential attributes thereof and, accordingly, reference should be made to the appended claims, rather than to the foregoing specification, as indicating the scope of the invention.

We claim:

1. A fiber bed mist eliminator assembly for removal of aerosols, including liquid and solid particulate matter, from a moving gas stream, comprising: a main filter element secured in the assembly containing a first fiber bed for removing aerosols from the gas stream and a pre-filter element containing a second fiber bed adjacent said main filter element and located upstream thereof, said second filter bed adapted to remove solid particulate matter from said gas stream before the gas stream contacts the main filter element, and means for detachably retaining said pre-filter element in the assembly, said retaining means further adapted to permit easy removal of said pre-filter for cleaning or replacement without removing the main filter element.

2. An assembly according to claim 1 wherein the second fiber bed is sandwiched between support screens.

3. An assembly according to claim 1 wherein the second fiber bed comprises fibers having a diameter from about 2 to about 100 microns and a packing density of from about 6 to about 12 pounds per cubic foot.

4. An assembly according to claim 3 wherein the fibers have a diameter from about 2 to about 100 microns.

5. An assembly according to claim 1 wherein the pre-filter element is capable of removing solid particulate matter having a diameter of 0.5 microns or greater from the moving gas stream.

6. An assembly according to claim 1 wherein the main filter is supported by a tube sheet.

7. An assembly as claimed in claim 1 wherein the packing density of the pre-filter element is substantially the same as the main filter element.

8. A fiber bed mist eliminator assembly for removal of aerosols, including liquid and solid particulate matter, from a moving gas stream comprising: an upstanding main filter element supported by a tube sheet and secured thereto containing a first fiber bed for removing aerosols from the gas stream; an upstanding pre-filter element comprising a second fiber bed sandwiched between a pair of support screens for removing solid particulate matter from the gas stream before the gas stream contacts the main filter element, said pre-filter element disposed concentrically with said main filter element and on the upstream side thereof; a top plate overlying the open end of the assembly removably secured to the main filter element; and means for detachably retaining said pre-filter element in the assembly, said means further adapted to permit easy removal of said pre-filter element for cleaning or replacement without removing the main filter element.

9. An assembly according to claim 8 wherein the means for detachably retaining said pre-filter in the assembly comprises a member for securing the pre-filter element to the main filter element.

10. An assembly according to claim 8 wherein a portion of said second fiber bed extends beyond the ends of said support screens to form a seal with said tube sheet or top plate.

11. A fiber bed mist eliminator assembly for removal of aerosols, including liquids and solid particulate matter, from a moving gas stream comprising: an upstanding main filter element supported by a tube sheet and secured thereto containing a first fiber bed for removing aerosols from the gas stream and an upstanding pre-filter element comprising a second fiber bed sandwiched between support screens, said pre-filter element adapted for removing solid particulate matter from the gas stream before the gas stream contacts the main filter element, said pre-filter element disposed concentrically with said main filter element and on the upstream side thereof; an opening formed in the tube sheet beneath the filter assembly for the passage of the gas stream; a removable top plate overlying said filter elements and having a concentrically disposed aperture for receiving a rod means; a threaded aperture supported in the opening of the tube sheet coaxially aligned with the centrally disposed aperture in the top plate; said rod means passing through said top plate aperture and threadably engaging the apertures supported in the tube sheet opening, said top plate secured to the filter assembly by a nut means on said rod.

12. An assembly according to claim 11 wherein the threaded aperture supported in the opening of the tube sheet comprises a threaded nut mounted on a cross bar diametrically spanning said tube sheet opening.

13. A method for removal of aerosols, including liquids and solid particulate matter from a moving gas stream comprising the steps of: (a) providing a fiber bed mist eliminator assembly, comprising a main filter element secured in the assembly, said main filter element containing a first fiber bed for removing aerosols from the gas stream, and (b) providing in said assembly a pre-filter element containing a second fiber bed, (c) locating the prefilter element adjacent the first fiber bed and upstream thereof, (d) removing solid particulate matter from said gas stream before the gas stream contacts the main filter element, (e) detachably retaining said pre-filter element in the assembly to permit easy removal of said pre-filter element for cleaning or replacement without removing the main filter element, and (f) passing the gas stream through the filter assembly to remove aerosols, including liquids and solid particulate matter.

14. A method according to claim 13 wherein the second fiber bed comprises fibers having a diameter from about 2 to about 100 microns and a packing density of from about 6 to about 12 pounds per cubic foot.

15. A method according to claim 14 wherein the fibers have a diameter from about 8 to about 50 microns.

16. A method according to claim 14 wherein the pre-filter element removes solid particulate matter having a diameter of 3 microns or greater from the moving gas stream.

* * * * *